United States Patent
Gordon et al.

(10) Patent No.: US 10,061,326 B2
(45) Date of Patent: Aug. 28, 2018

(54) MISHAP AMELIORATION BASED ON SECOND-ORDER SENSING BY A SELF-DRIVING VEHICLE

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Yorktown Heights, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 14/963,272

(22) Filed: Dec. 9, 2015

(65) Prior Publication Data

US 2017/0168502 A1 Jun. 15, 2017

(51) Int. Cl.
*G05D 1/02* (2006.01)
*B60R 21/0134* (2006.01)
(Continued)

(52) U.S. Cl.
CPC ....... *G05D 1/0289* (2013.01); *B60R 21/0132* (2013.01); *B60R 21/0134* (2013.01);
(Continued)

(58) Field of Classification Search
CPC combination set(s) only.
See application file for complete search history.

(56) References Cited

U.S. PATENT DOCUMENTS 4,665,395 A 5/1987 Van Ness
4,908,988 A 3/1990 Yamamura et al.
(Continued)

FOREIGN PATENT DOCUMENTS

CN 1135063 11/1996
CN 2349068 Y 11/1999
(Continued)

OTHER PUBLICATIONS

Crothers, Brooke "Google Now Reporting Self-Driving Car Accidents: Hey, Its Not the Car's Fault". Forbes.com, Jun. 8, 2015. <http://www.forbes.com/sites/brookecrothers/2015/06/08/google-now-reporting-driverless-car-accidents/>.
(Continued)

*Primary Examiner* — Thomas G Black
*Assistant Examiner* — Ana D Thomas
(74) *Attorney, Agent, or Firm* — Law Office of Jim Boice

(57) ABSTRACT

A self-driving vehicle (SDV) ameliorates a vehicular mishap incurred by a second vehicle. At least one sensor on a first SDV detects a second vehicle that has been involved in a vehicular mishap. One or more processors determine a confidence level L, which is a confidence level of a mishap assessment accuracy of determining that the second vehicle has been involved in the vehicular mishap. In response to the confidence level L exceeding a predetermined value, the SDV executes an amelioration action to ameliorate a condition of the second vehicle that has been involved in the vehicular mishap.

20 Claims, 8 Drawing Sheets

(51) Int. Cl.
*B60R 21/0132* (2006.01)
*B60R 21/015* (2006.01)
*B60W 30/09* (2012.01)
*B60W 40/08* (2012.01)
*B60R 21/00* (2006.01)

(52) U.S. Cl.
CPC ....... *B60R 21/01512* (2014.10); *B60W 30/09*
(2013.01); *B60W 40/08* (2013.01); *G05D*
*1/024* (2013.01); *B60R 2021/0027* (2013.01)

(56) References Cited

U.S. PATENT DOCUMENTS

| | | |
|---|---|---|
| 5,975,791 A | 11/1999 | McCulloch |
| 6,064,970 A | 5/2000 | McMillian et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,140,358 B1 | 3/2012 | Ling et al. |
| 8,146,703 B2 | 4/2012 | Baumann et al. |
| 8,152,325 B2 | 4/2012 | McDermott |
| 8,180,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,509,982 B2 | 8/2013 | Montemerlo et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,793,046 B2 | 7/2014 | Lombrozo et al. |
| 8,810,392 B1 | 8/2014 | Teller et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,924,150 B2 | 12/2014 | Tsimhoni et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,218,698 B2 * | 12/2015 | Ricci ..................... H04W 4/21 |
| 9,286,520 B1 | 3/2016 | Lo et al. |
| 9,305,411 B2 | 4/2016 | Ricci |
| 9,317,033 B2 | 4/2016 | Ibanez-guzman et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,552,735 B2 * | 1/2017 | Pilutti ..................... G08G 1/22 |
| 9,628,975 B1 | 4/2017 | Watkins et al. |
| 9,646,496 B1 | 5/2017 | Miller |
| 2002/0026841 A1 | 3/2002 | Svendsen |
| 2002/0128774 A1 | 9/2002 | Takezaki et al. |
| 2003/0065572 A1 | 4/2003 | McNee et al. |
| 2003/0076981 A1 | 4/2003 | Smith et al. |
| 2004/0078133 A1 | 4/2004 | Miller |
| 2004/0199306 A1 | 10/2004 | Helmann et al. |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Yuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0065293 A1 | 3/2008 | Placke et al. |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2009/0094109 A1 | 4/2009 | Aaronson et al. |
| 2009/0138168 A1 | 5/2009 | Labuhn et al. |
| 2009/0248231 A1 | 10/2009 | Kamiya |
| 2009/0313096 A1 | 12/2009 | Kama |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0035250 A1 | 2/2011 | Finucan |
| 2011/0077807 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0139756 A1 | 6/2012 | Djurkovic |
| 2012/0177947 A1 | 11/2012 | Boehringer et al. |
| 2012/0293341 A1 | 11/2012 | Lin |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Gomez et al. |

(56) References Cited

U.S. PATENT DOCUMENTS

| | | | |
|---|---|---|---|
| 2014/0358353 | A1 | 12/2014 | Ibanez-Guzman et al. |
| 2015/0006005 | A1 | 1/2015 | Yu et al. |
| 2015/0006014 | A1 | 1/2015 | Wimmer et al. |
| 2015/0026092 | A1 | 1/2015 | Abboud et al. |
| 2015/0035685 | A1 | 2/2015 | Strickland et al. |
| 2015/0051778 | A1 | 2/2015 | Mueller |
| 2015/0057891 | A1 | 2/2015 | Mudalige et al. |
| 2015/0062340 | A1 | 3/2015 | Datta et al. |
| 2015/0062469 | A1 | 3/2015 | Fleury |
| 2015/0066282 | A1 | 3/2015 | Yopp |
| 2015/0066284 | A1 | 3/2015 | Yopp |
| 2015/0070178 | A1 | 3/2015 | Kline |
| 2015/0095190 | A1 | 4/2015 | Hammad et al. |
| 2015/0120331 | A1 | 4/2015 | Russo et al. |
| 2015/0134178 | A1 | 5/2015 | Minoiu-Enache |
| 2015/0137985 | A1 | 5/2015 | Zafiroglu et al. |
| 2015/0141043 | A1 | 5/2015 | Abramson |
| 2015/0149018 | A1 | 5/2015 | Attard et al. |
| 2015/0149021 | A1 | 5/2015 | Duncan et al. |
| 2015/0160019 | A1 | 6/2015 | Biswal et al. |
| 2015/0166059 | A1 | 6/2015 | Ko |
| 2015/0175070 | A1 | 6/2015 | Attard et al. |
| 2015/0178998 | A1 | 6/2015 | Attard et al. |
| 2015/0196256 | A1 | 7/2015 | Venkatraman et al. |
| 2015/0232065 | A1 | 8/2015 | Ricci et al. |
| 2015/0293994 | A1 | 10/2015 | Kelly |
| 2015/0338226 | A1 | 11/2015 | Mason et al. |
| 2015/0339639 | A1 | 11/2015 | Choe |
| 2016/0001781 | A1 | 1/2016 | Fung et al. |
| 2016/0026182 | A1 | 1/2016 | Boroditsky et al. |
| 2016/0075512 | A1 | 3/2016 | Lert, Jr. |
| 2016/0078695 | A1 | 3/2016 | McClintic et al. |
| 2016/0078758 | A1 | 3/2016 | Basalamah |
| 2016/0090100 | A1 | 3/2016 | Oyama et al. |
| 2016/0139594 | A1 | 5/2016 | Okumura et al. |
| 2016/0140507 | A1 | 5/2016 | Stevens et al. |
| 2016/0176409 | A1 | 6/2016 | Kirsch et al. |
| 2016/0303969 | A1 | 10/2016 | Akula |
| 2016/0334797 | A1 | 11/2016 | Ross et al. |
| 2016/0344737 | A1 | 11/2016 | Anton |
| 2016/0355192 | A1 | 12/2016 | James et al. |
| 2016/0364823 | A1 | 12/2016 | Cao |
| 2017/0010613 | A1 | 1/2017 | Fukumoto |
| 2017/0088143 | A1 | 3/2017 | Goldman-Shenhar et al. |
| 2017/0123428 | A1* | 5/2017 | Levinson ............ G05D 1/0214 |
| 2017/0151958 | A1 | 6/2017 | Sakuma |
| 2017/0168689 | A1 | 6/2017 | Goldman-Shenhar et al. |
| 2017/0200449 | A1 | 7/2017 | Penilla et al. |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 A1 | 2/1994 |
| WO | 2014058263 A1 | 4/2014 |
| WO | 2014066721 A2 | 5/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

P. Mell et al., "The NIST Definition of Cloud Computing", National Institute of Standards and Technology, Information Technology Laboratory, Sep. 2011, pp. 1-7.

U.S. Appl. No. 14/855,731 Non-Final Office Action dated Apr. 15, 2016.

U.S. Appl. No. 14/887,388, filed Oct. 20, 2015.

X. Jardin, "Terrifying Dashcam Video Captures Distracted Teen Drivers Crashing While Goofing Off", Boing Boing, www/boingboing.net, March 26, 2015, 1 Page.

M. Fox, "Self-Driving Cars Safer Than Those Driven by Humans: Bob Lutz", CNBC, www.cnbc.com, Sep. 8, 2014, 1 Page.

Gomes, Lee. "Google'S Self-Driving Cars Still Face Many Obstacles / MIT Technology Review.", MIT Technology Review. Aug. 28, 2014. Web. <http://www.technologyreview.co,/news/530276/hidden-obstacles-for-googles-self-driving-cars/>.

Smith, Mark. "Inovations: Emerging Trends in the Wheelchair Market." New Mobility Magazine, Aug. 1, 2014. Web. <http://www.newmobility.com/2014/08/emerging-trends/>.

A. Abkowitz, "Do Self-Driving Cars Spell Doom for Auto Insurers?", Bloomberg L.P., Sep. 10, 2014, pp. 1-2.

Anonymous, 'System and Method to Target Advertisements for the Right Focus Group'. ip.com, No. 000218285, May 31, 2012, pp. 1-2.

Anonymous, "Car Built-In Mechanism to Enforce Mandatory Self-Driving Mode", ip.com, No. 000234916, Feb. 14, 2014, pp. 1-3.

T. Horberry et al, "Driver Distraction: the Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technologu'S Benefits, Potential Risks, and Solutions", The Energy Collective, theenergycollective.com, Aug. 19, 2014, pp. 1-7.

J. O'Callaghan, "Inside the Mercedes Self-Guidubg Car That'S Built for Luxurious Living in, Not Driving", Associated Newspapers LTD., Daily Mail, dailymail.com.uk, Jan. 6, 2015, pp. 1-13.

J. Wei et al., "Towards a Viable Autonomous Driving Research Platform", IEEE, Intelegent Vehicles Symposium (IV), 2013, pp. 1-8.

J. Farrier, "Airlines Infuse Their Planes With Smells to Calm You Down", Neatorama, neatorama.com, Mar. 29, 2015, 1 Page.

T. Vanderbilt, "Let the Robot Drive: the Autonomous Car of the Future is Here", Wired Magazine, Conde Nast, www.wired.com, Jan. 20, 2012. pp. 1-34.

Chen S, et al., A Crash Risk Assessment Model for Roas Curves. Inproceedings 20th International Technical Conference on the Enhanced Saftey of Vehicles., 2007. Lyon, France.

E. Lehrer, "The Insurance Implications of Google'S Self-Driving Car", Insurance Journal, Sight Street BLOH=G, May 28, 2014, pp. 1-2.

Anonymous, "Self-Driving Cars and Insurance", Insurance Information Institute, Inc., Feb. 2015, pp. 1-3.

Anonymous, "Diagnostics Mechanism for Self-Driving Cars to Validate Self-Driving Capabilities", ip.com, Jun. 6, 2014, pp. 1-5. ip.com.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today'S Crash-Avoidance Systems are the Mile Markers to Tomorrows Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More".

(56) References Cited

OTHER PUBLICATIONS patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.

C. Berger et al., "COTS—Architecture With a Real-Time OS for a Self-Driving Miniature Vehicle", SAFECOMP 2013—Workshop ASCOMS of the 32nd International Conference on Computer Safety, Reliability and Security, Sep. 2013, Toulouse, France, pp. 1-13.

* cited by examiner

MISHAP AMELIORATION BASED ON SECOND-ORDER SENSING BY A SELF-DRIVING VEHICLE

BACKGROUND

The present disclosure relates to the field of vehicles, and specifically to the field of self-driving vehicles. Still more specifically, the present disclosure relates to the field of detecting and issuing a notification of a self-driving vehicle that has been involved in a mishap.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In an embodiment of the present invention, a method and/or computer program product uses a first self-driving vehicle (SDV) to ameliorate a vehicular mishap incurred by a second vehicle. At least one sensor on a first SDV detects a second vehicle that has been involved in a vehicular mishap. One or more processors determine a confidence level L, which is a confidence level of a mishap assessment accuracy of determining that the second vehicle has been involved in the vehicular mishap. In response to the confidence level L exceeding a predetermined value, the first SDV executes an amelioration action to ameliorate a condition of the second vehicle that has been involved in the vehicular mishap.

In an embodiment of the present invention, a self-driving vehicle (SDV) comprises: a processor, a computer readable memory, and a non-transitory computer readable storage medium; first program instructions to detect, by at least one sensor on the SDV, a second vehicle that has been involved in a vehicular mishap; second program instructions to determine a confidence level L, wherein the confidence level L is a confidence level of a mishap assessment accuracy of determining that the second vehicle has been involved in the vehicular mishap; and third program instructions to, in response to the confidence level L exceeding a predetermined value, execute, by the SDV, an amelioration action to ameliorate a condition of the second vehicle that has been involved in the vehicular mishap; and wherein the first, second, and third program instructions are stored on the non-transitory computer readable storage medium for execution by one or more processors via the computer readable memory.

DETAILED DESCRIPTION

Figure 1:
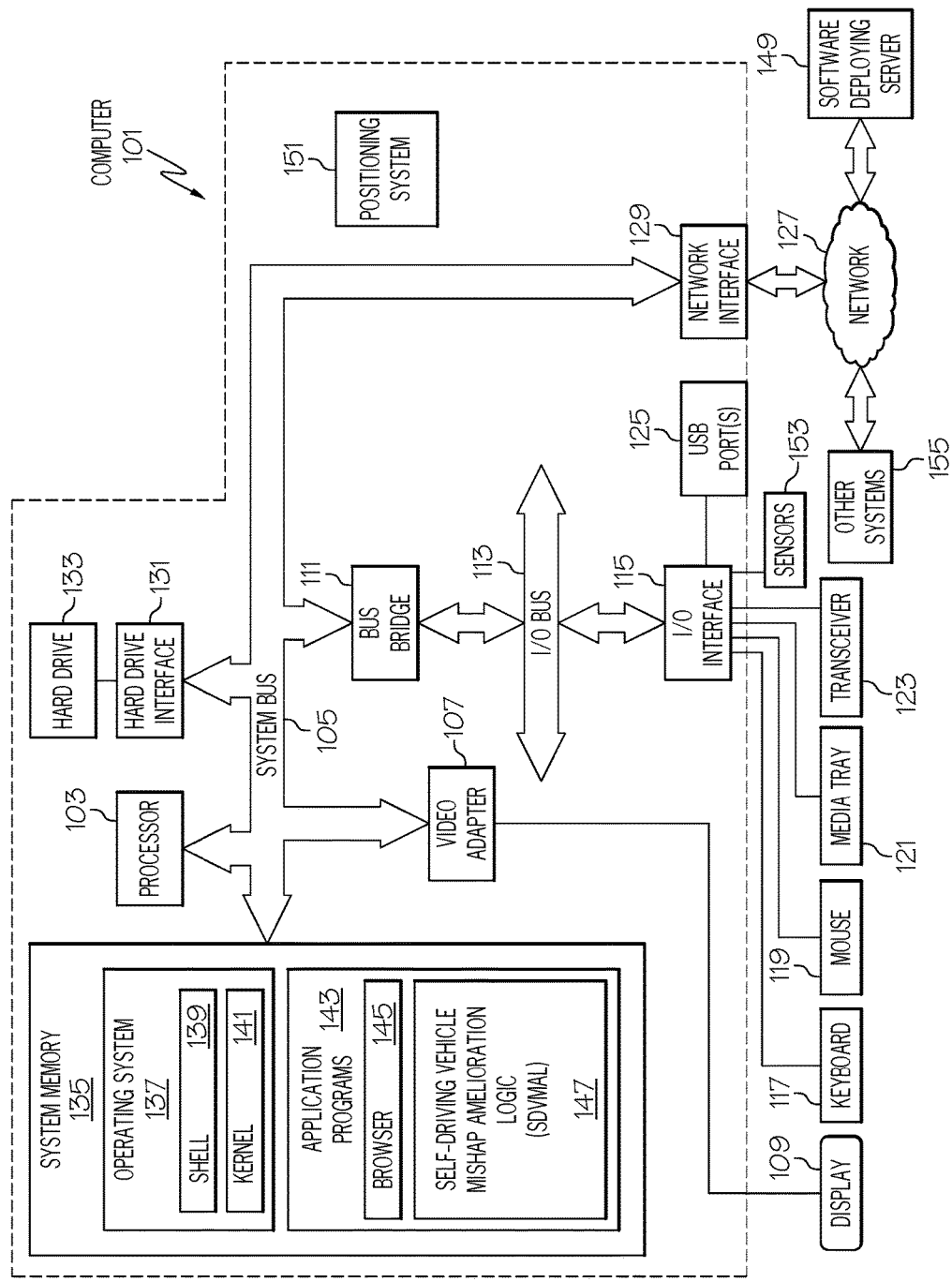
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Disclosed herein is a system and method to redeploy sensors used by a self-driving vehicle (SDV) to drive autonomously for the purpose of detecting that another vehicle has likely had a mishap. This determination is then followed up with notification to authorities. An example is when a light detection and ranging (LIDAR) system on an SDV is used not only to find neighboring vehicles and the distance to the road shoulder, but also to compare these distances to ascertain if the neighboring vehicle has driven off the road, or is in an unusual attitude (on its side or upside down). At this point, a notification can be sent and help may be summoned. Additionally the notification may be made together with communication of data about the crash from the perspective of the SDV, which may be useful to emergency responders and/or mishap investigators.

In one or more embodiments of the present invention, the mishap to the vehicle is a vehicular collision, either a multi-vehicular collision or a single-vehicle collision.

In one or more embodiments of the present invention, the mishap to the vehicle is a breakdown in a system within the vehicle, such as a mechanical failure, an electrical failure, a hydraulic failure, a braking failure, etc. Such failures may be total or partial.

The present invention does not rely on information being transmitted from the vehicle (SDV or non-SDV) that has been involved in a mishap (e.g., a single vehicle accident, such as a rollover, striking a barrier, etc.). For example, the vehicle involved in the mishap may have a safety alert system that automatically alerts a monitoring service of the mishap. However, if the mishap disabled the electrical system or otherwise disabled the ability of the vehicle involved in the mishap to communicate its distress, then the safety alert system is useless. Similarly, if the vehicle involved in the mishap is in a reception "dead zone" (e.g., a physical area in which cellular service is compromised or does not exist), then the safety alert system is similarly useless.

There are certain road locations that are monitored by cameras. However, these locations are usually in urban areas. Thus, there are no cameras to detect/report mishaps in rural or lightly traveled roads.

Thus, the present invention utilizes SDVs that act as "roving" vehicular mishap detectors. The roving vehicular mishap detecting SDVs may or may not be carrying passengers. Furthermore, the roving vehicular mishap detecting SDVs may be tasked with only looking for vehicles in trouble (i.e., having been involved in a mishap).

The present invention presents a method and system that includes a self-driving vehicle (SDV) equipped with sensors that may be employed for detecting a potential mishap of another vehicle. Based on this sensing of a mishap with confidence level L (where L is a confidence level of the accuracy of accessing a vehicular mishap), an amelioration action is automatically taken. These sensors may be redeployed sensors used by a self-driving vehicle (SDV) to drive autonomously for the purpose of detecting that another vehicle has likely had a mishap.

Consider the case in which the SDV's Light Detection and Ranging (LIDAR) is used not only to find neighboring vehicles and the distance to the road shoulder, but also to compare these distances to ascertain if the neighboring vehicle has driven off the road. At this point, a notification can be sent and help may be summoned. Additionally the notification may be made together with communication of data about the crash/mishap from the perspective of the SDV, which may be useful for emergency response, and for mishap investigation and insurance purposes.

The sensor(s) used on the SDV to detect other vehicles in distress (e.g., from being involved in a mishap) may involve LIDAR, video systems, audio systems, vibration sensors, distress-call signal generators, and combinations of these sensors and sensor information, etc. Multiple inputs from sensors or one or more kinds may be used to increase the value of confidence level L.

The amelioration action may include reporting the mishap to authorities, taking a photo, recording audio or video associated with of the mishap (useful for the investigative authorities), etc.

The SDV may also use motion sensing (or image processing) sensors to determine if the there is any movement in the other vehicle (which is useful information to be reported to authorities).

The SDV may also use audio sensors to determine if any sounds are coming from the other vehicle (e.g., the voice of a trapped person calling out for help). This trapped person may not be visible (e.g., to the passing-by SDV) from outside the car. The audio recording may also be useful for helping authorities to reconstruct the mishap sequence.

Air-testing: The SDV can also use air testing sensors to determine if any fluids (e.g., gasoline, benzene, xylene, etc.) are leaking from the other vehicle.

The SDV can record pictures (video or still) of the roadway near a location where it has determined that a mishap may have occurred. These pictures can then be compared to similar pictures taken previously and processed to determine whether skid marks exist at the time where a mishap may have occurred. These pictures can be used to determine how the mishap may have occurred and the sides of the cars that may have been damaged. Pictures can also be used to determine any fluids on the road from a car. These pictures can be sent to a server in real-time, and the server can determine dynamically in real-time (by an analysis of the images) the state of the vehicle involved in the mishap as well as other neighboring vehicles in order to ascertain whether or not there are any issues with one or more of them.

The SDV may report the mishap to other nearby cars that have subscribed to its alerting capabilities.

The SDV may also optionally ask its passenger (if it has a passenger) if the passenger would like to report the potential mishap of another vehicle that the SDV considers to have had a mishap, with confidence level L.

In some scenarios, optionally, a weighted voting system may be used to weight the various variables used in making the decision regarding mishap report generation. Such inputs may include: a history of mishaps in the area, road conditions, other cars stopping, votes by nearby cars, etc. Such weighted voting approaches may be characterized primarily by three aspects: the inputs, the weights, and the quota. The inputs are (I1, I2, . . . , IN). N denotes the total number of inputs. An input's weight (w) is the number of "votes" associated with the input. The quota (q) is the minimum number of votes required to "pass a motion", which in this case refers primarily to a decision made by the SDV to report the mishap in which the other vehicle was involved.

Optionally, the current scanning SDV (preferably unmanned) and/or others SDVs may be called to create a protective swarm around a crashed vehicle, if space permits.

In one or more alternative embodiments of the present invention, the SDV involved in a mishap has stored information on its primary driver and/or occupants of the vehicle.

Moreover, a database may optionally be maintained relating to the driver's medical condition. This may be maintained in an opt-in fashion so as not to sacrifice the privacy of the person. This medical information may be transmitted or determined by the scanning SDV so as to facilitate emergency operations. If desired, the SDV may contribute to a database of information containing information such as monthly reports on mishaps. Deep neural networks may be used to estimate the presence of one or more people in the crashed car, or near the car with a mishap. Furthermore, video may also be transmitted to the authorities to also provide an indication of people involved.

Optionally, the system may employ a GPS module to capture the location of a vehicle mishap, and a message can be transmitted that contains the coordinate value with the help of a cellular network modem. Optionally, to provide fast medical treatment to the victim of vehicle mishap, the SDV may send a message to police or hospitals near the location of the mishap to minimize the time required for legal police processing, and a victim can get fast treatment.

If desired, the autonomous vehicle positioning system may be employed for determining a position of a remote vehicle relative to the mobile host vehicle based on safety alert messages broadcast from the remote vehicle relating to an event.

If a vehicle in a mishap can generate a mishap signal (which may indicate a fault in the vehicle of may indicate that the vehicle has been involved in a collision), this may be used to increase the confidence level L that a mishap has occurred.

The technical methods used to identify an object in connection with the vehicle may include the use of one or more cameras and radar sensors to generate images of the surroundings. Laser technologies, both scanning lasers and fixed lasers, could be used to detect objects and measure distances. These are often referred to as LIDAR (Light Detection and Ranging) or LADAR (Laser Detection and Ranging). Various sensors can also used in order to sense velocity and acceleration in various directions or that a car is not moving. Positioning systems with GPS (Global Positioning System) and other wireless technology can also be used to determine whether the vehicle is, for example, approaching an intersection (or has stopped moving), or if the vehicle is in a narrowing of the road, near road construction, near a school, etc.

Optionally, a fault management and degradation strategy can be initiated that is configured so as to maneuver the vehicle to a preferred state/place/location in the event that the driver is unable to control the vehicle manually. This initiation may be done by the SDV that is scanning for a mishap or by the SDV that is potentially itself involved in a mishap or is having some other problem. The driver is first warned, and the vehicle can then, for example, be maneuvered to the side of the road and stopped. Such actions are predicated by a passing-by SDV determining that there is a problem with the other vehicle. Thus, the scanning (passing-by) SDV may direct another SDV to maneuver to the side of the road and stop (e.g., if a driver has lost consciousness in that vehicle).

If desired, an autonomous vehicle that is scanning for mishaps of others may determine that a speed of another vehicle (autonomous or non-autonomous) is less than or equal to a threshold speed, despite traffic and traffic controls conditions (i.e., there is not a red light nearby). This indicates that the other vehicle has inappropriately come to a stop.

Pooling of Information: The pooling of information from multiple SDV "witnesses" of a mishap creates a multi-point-of-view (mPOV) report on the mishap, which includes more accurate information about the other vehicle, including its location, speed, heading, movements, etc., before, during, and/or after the crash. This composite report may include panoramic imagery, LIDAR models, and additional rotational information through scene and object stitching that would otherwise not be possible.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 155 shown in FIG. 1, and/or first responder system 201 shown in FIG. 2 and FIG. 3, and/or a self-driving vehicle (SDV) on-board computer 401 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other systems 155 (e.g., establishing communication among SDV 202, compromised vehicle 204, SDV 210, and/or first responder system 201 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Mishap Amelioration Logic (SDVMAL) 147. SDVMAL 147 includes code for implementing the processes described below, including those described in FIGS. 2-5. In one embodiment, computer 101 is able to download SDVMAL 147 from software deploying server 149, including in an on-demand basis, wherein the code in SDVMAL 147 is not downloaded until needed for execution. In one embodiment of the present invention, software deploying server 149 performs all of the functions associated with the present invention (including execution of SDVMAL 147), thus freeing computer 101 from having to use its own internal computing resources to execute SDVMAL 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles including erratically driven vehicles as described herein, road obstructions, pavement, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
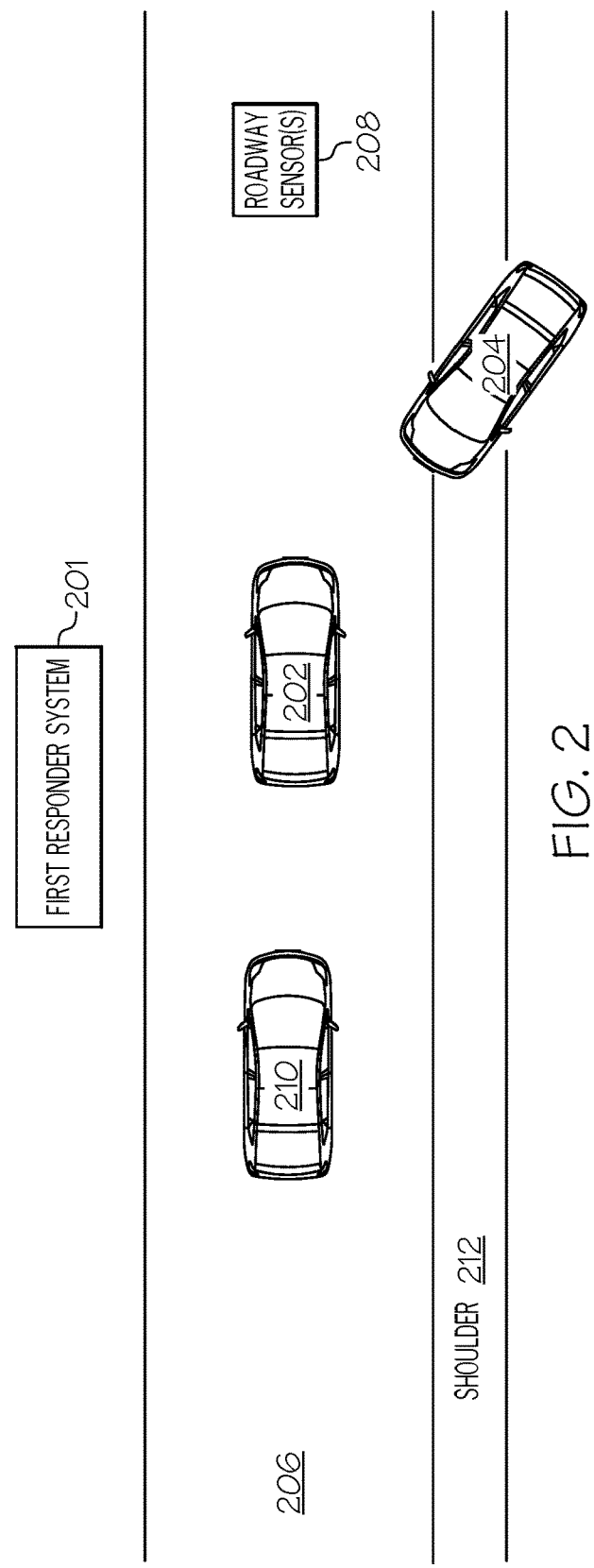
FIG. 2 illustrates an exemplary self-driving vehicle (SDV) encountering a second vehicle that has incurred a vehicular mishap on a roadway in accordance with one or more embodiments of the present invention.

With reference now to FIG. 2, an exemplary self-driving vehicle (SDV) 202 and a compromised vehicle 204 on or near a roadway 206 in accordance with one or more embodiments of the present invention is presented. Roadway 206 may be a public roadway, a private roadway, a parking lot, a paved road, an unpaved road, and/or any other surface capable of supporting vehicles, which may be wheeled (e.g., cars), tracked (e.g., trains), or a combination thereof.

A compromised vehicle is defined as a vehicle that is has been involved in a mishap. The mishap may be caused by a mechanical failure in the compromised vehicle, or it may be the result of a collision with another vehicle, a fixed object, running off the roadway, etc. As depicted in FIG. 2, compromised vehicle 204 has run off the roadway 206, is off the shoulder 212, and is at an unnatural angle relative to roadway 208. Compromised vehicle 204 may be in the position shown in FIG. 2 as a result of a single vehicle mishap or a multi-vehicle mishap, or from the compromised vehicle 204 simply going out of control due to road conditions (e.g., ice on the road) or from driver incompetence.

In one embodiment, compromised vehicle 204 is an SDV operating in autonomous mode (discussed below) whose systems are malfunctioning, thus resulting in the predicament shown for compromised vehicle 204. In another embodiment, compromised vehicle 204 is either an SDV operating in manual mode (also discussed below), or is a non-SDV vehicle that is always driven in manual mode, such that a human driver caused the mishap incurred by compromised vehicle 204.

In accordance with one or more embodiments of the present invention, SDV 202 utilizes on-board sensors and/or readings from roadway sensor(s) 208 to determine the state of compromised vehicle 204. In response to making this determination, on-board controllers (discussed below) on the SDV 202 adjust the controls of SDV 202 to provide ameliorative actions for the compromised vehicle 204 (e.g., notifying the proper officials of the location and state of compromised vehicle 204, sending control commands to compromised vehicle 204, etc.).

Current conditions of the roadway 206, including weather conditions, traffic conditions, construction events, mishap events, etc., can be determined and transmitted by roadway sensor(s) to a first responder system 201 and/or SDVs (e.g., SDV 202). Furthermore, SDV 202 is able to determine current roadway conditions based on internal sensors 153 shown in FIG. 1, and/or roadway sensor(s) 208 (e.g., mechanical, visual, and/or electrical sensors that are able to detect the number and speed of vehicles traveling on the roadway 206, the amount and/or type of precipitation on the roadway 206, the temperature of the roadway 206 and/or ambient air around the roadway 206, the movement of vehicles traveling along roadway 206, etc.), as well as information received from sensors and/or on-board computers within SDV 202 and/or compromised vehicle 204 (see FIG. 3), and/or from information received by an information service (e.g., a weather station). In one or more embodiments, these roadway conditions are utilized in the decision regarding into which operational/driving mode the SDV 202 should be placed.

In accordance with one or more embodiments of the present invention, SDV 202 may be driven in "manual mode", "nominal autonomous mode", "assistance autonomous mode", or "stopping autonomous mode", each of which are referred to herein as an operational mode or a driving mode, where the terms "operational mode" and "driving mode" are synonymous and interchangeable.

As used and described herein, "manual mode" is defined as an SDV being at least partially under the input control of a human driver. That is, if SDV 202 is being steered by a human driver but has cruise control activated, then it is in manual mode, since SDV 202 is partially under the input control (steering) of the human driver. Thus, while in manual mode, even SDV 202 can operate as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to an SDV control processor 303 (shown in FIG. 3) by the driver result in output signals that control the SDV vehicular physical control mechanisms 305 (e.g., the engine throttle, steering mechanisms, braking systems, turn signals, etc.).

Figure 3:
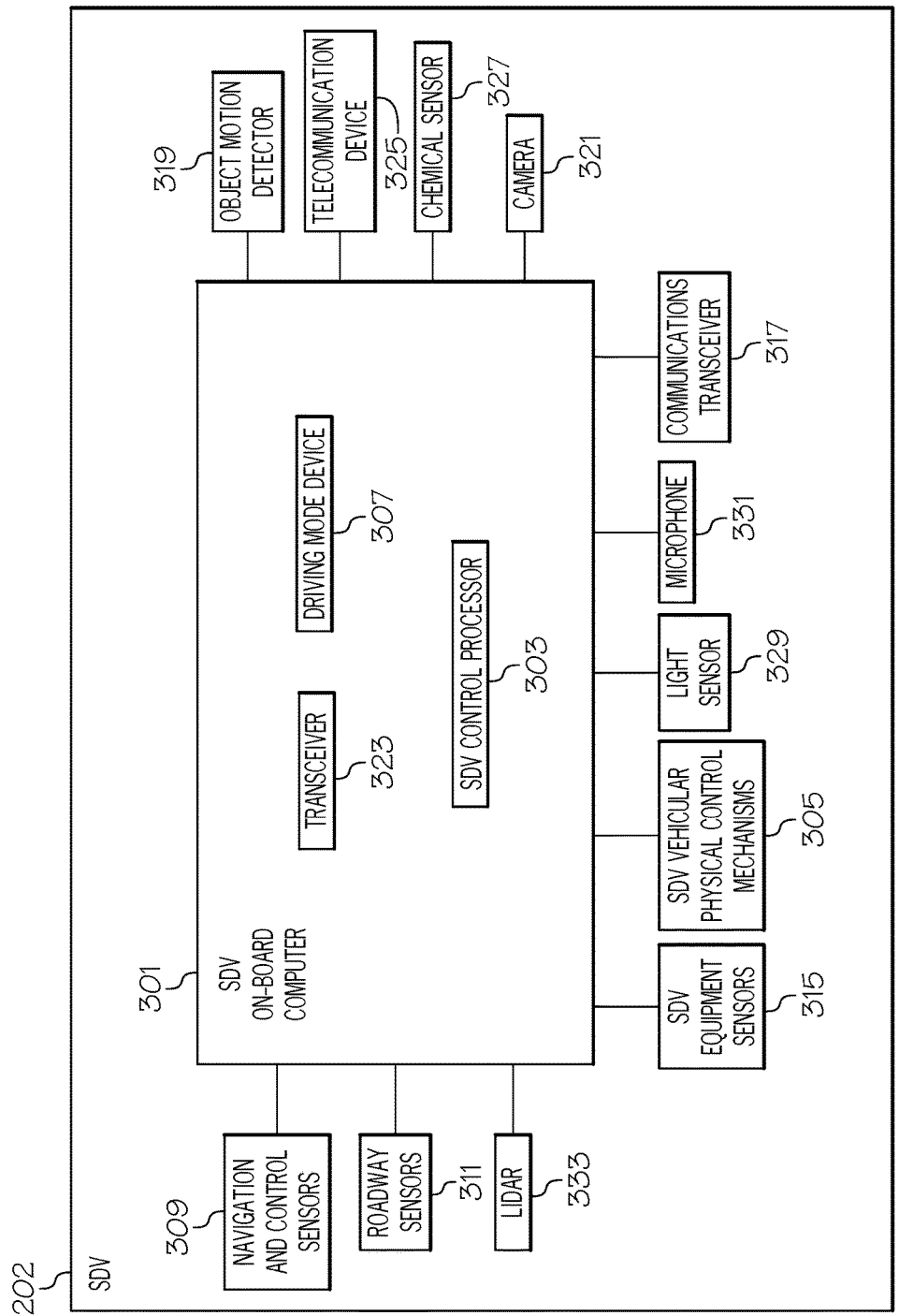
FIG. 3 depicts additional detail of hardware within an SDV.

As used and described herein, "nominal autonomous mode" is defined as an SDV being totally controlled by hardware/software logic (e.g., SDV on-board computer 301 and/or driving mode device 307 and/or SDV control processor 303 shown in FIG. 3) without inputs from the human driver under roadway and/or SDV conditions that have been predetermined to be normal (i.e., "nominal"). That is, if steering, braking, throttle control, obstacle/vehicle avoidance, etc. are all under the control of hardware/software logic such as the SDV on-board computer 301 shown in FIG. 3, then SDV 202 is in an autonomous mode, including the "nominal autonomous mode" in which roadway conditions are normal. Roadway and/or SDV conditions are deemed to be normal/nominal if no compromised vehicles (e.g., compromised vehicle 206 shown in FIG. 2) are detected by SDV 202.

As used and described herein, "assistance autonomous mode" is defined as an SDV being totally controlled by hardware/software logic (e.g., SDV on-board computer 301 and/or driving mode device 307 and/or SDV control processor 303 shown in FIG. 3) without inputs from the human driver (similar to "nominal autonomous mode"), but being redirected to not only control SDV 202, but to also determine if another vehicle (e.g., compromised vehicle 204 shown in FIG. 2) has had a mishap, if a passenger has been injured, etc. That is, if sensors within SDV 202 detect a vehicle within a certain proximity to SDV 202 is apparently in a compromised state (e.g., has driven off the roadway 206, is upside down, is barely moving along shoulder 212, etc.), then going into "assistance autonomous mode" (as instructed by the driving mode device 307 in FIG. 3) causes the SDV on-board computer 301 shown in FIG. 3 to execute instructions designed for 1) determining the anomalous state of the compromised vehicle 204 and/or 2) executing actions to ameliorate the anomalous state of the compromised vehicle 204. Such instructions may result in SDV 202 slowing down, certain on-board sensors being activated/monitored, etc.

For example, assume that object motion detector 319 (described below) and/or the on-board camera 321 and/or LIDAR 333 in SDV 202 detects compromised vehicle 204 on shoulder 212 as shown in FIG. 2. More specifically, SDV on-board computer 301 receives and interprets readings/outputs from object motion detector 319 and/or camera 321 and/or LIDAR 333 to determine that there is a problem with compromised vehicle 204 (e.g., it has been involved in a mishap). This determination will cause the SDV on-board computer 301 to slow down and/or reposition SDV 202 relative to the compromised vehicle 204, in order to afford light sensor 329, microphone 331, chemical sensor 327, and/or communications transceiver 317 the ability to obtain more information about the state of compromised vehicle 204.

In one embodiment of the present invention, light sensor 329 senses headlights/taillights on compromised vehicle 204 to determine the orientation of compromised vehicle 204 relative to roadway 206. Furthermore, light sensors 329 sense flashing lights on compromised vehicle 204 to determine that an emergency warning system has been activated on compromised vehicle 204.

In one embodiment of the present invention, microphone 331 detects if any sounds are coming from compromised vehicle 204. For example, microphone 331 may detect the sounds of injured passengers within compromised vehicle 204 and/or physical problems (e.g., an engine racing out of control, etc.) with compromised vehicle 204.

In one embodiment of the present invention, chemical sensor 327 detects any leaking liquids (e.g., gasoline, etc.) coming from compromised vehicle 204. Chemical sensor 327 includes materials whose electronic properties change when exposed to specific chemicals, thus providing an analog/digital signature for a specific concentration of a particular chemical. Thus, chemical sensor 327 represents any chemical/air testing sensor, which is able to detect any material hazardous or non-hazardous substances (in vapor or liquid states), including water, gasoline, carbon monoxide, carbon dioxide, etc.

In one or more embodiments, chemical sensor 327 is able to detect the presence of battery materials that have been released during a mishap and/or a resulting fire. For example, assume that compromised vehicle 204 is an all electric or a hybrid vehicle that uses lithium-ion batteries as a power source. Once a bank of lithium-ion batteries are ruptured, they release hydrofluoric acid. Furthermore, if ignited, the bank of lithium-ion batteries requires special methods to extinguish the fire, such as using large amounts of water for an extended time, chemical fire suppressants, etc. Chemical sensor 327 is able to detect the presence of chemicals that indicate a breach to the integrity of the bank of batteries, such that the first responder will be forewarned in order to be adequately prepared.

In one embodiment of the present invention, communications transceiver 317 receives any emergency signals being transmitted from compromised vehicle 204. For example, an automatic emergency beacon may be activated by a transceiver within compromised vehicle 204 in the event of a mishap, or an audio signal may be generated by a passenger within compromised vehicle 204 indicative of the emergency condition and what type of help is needed. In one or more embodiments, the communications transceiver 317 is of such limited range (e.g., 200 feet) that only passing-by vehicles (e.g., SDV 202) are within signal range.

As used and described herein, "stopping autonomous mode" is defined as an SDV being totally controlled by hardware/software logic (e.g., SDV on-board computer 301 and/or driving mode device 307 and/or SDV control processor 303 shown in FIG. 3) without inputs from the human driver (similar to "nominal autonomous mode" or "assistance autonomous mode"), but now specifically designed to steer the SDV to a safe location (e.g., a roadway shoulder, a next exit, etc.) and stopping the SDV at that safe location. In one embodiment, this results in SDV 202 becoming part of a "swarm" of one or more (preferably unoccupied) SDVs that physically protect the compromised vehicle 204.

Figure 4:
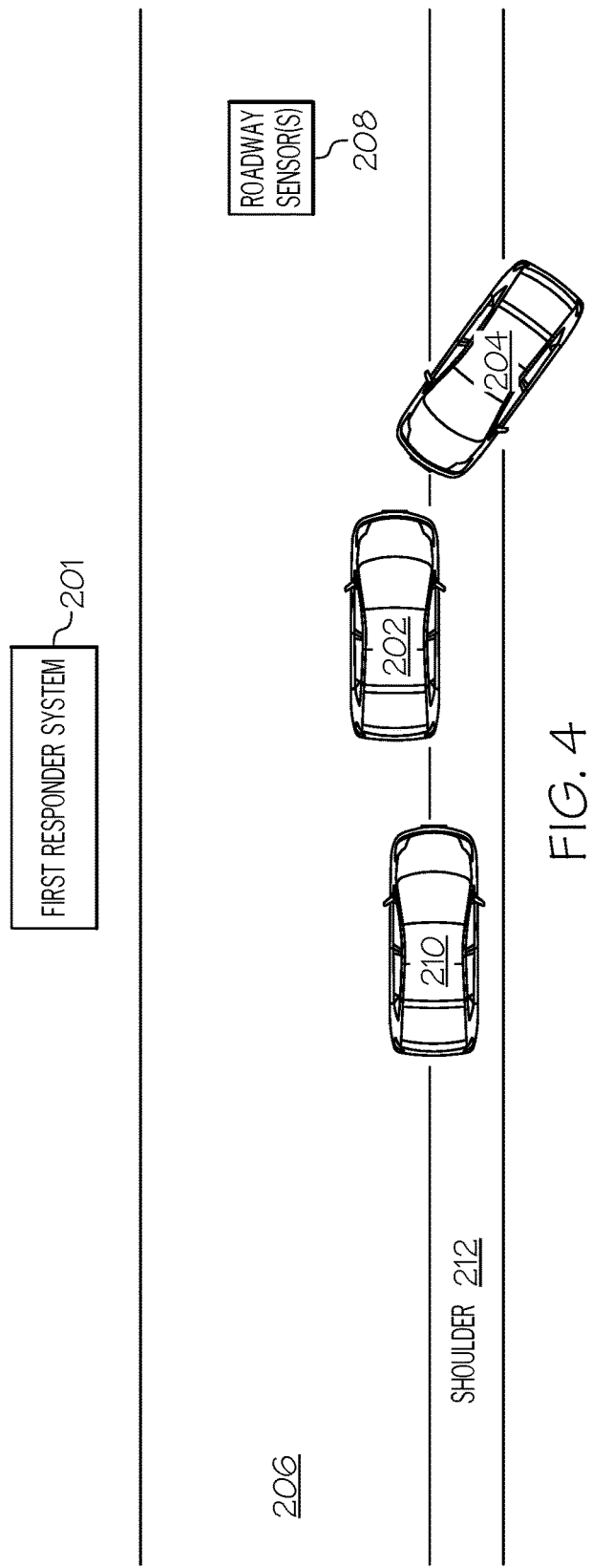
FIG. 4 depicts the second vehicle form FIG. 2 being protected by a swarm of autonomous SDVs.

For example, consider now FIG. 4, in which compromised vehicle 204 is still on the shoulder 212 of roadway 206. However, now SDV 202 as well as SDV 210 have gone into assistance/stopping autonomous mode to provide a physical barricade ("swarm") around compromised vehicle 204, thus protecting compromised vehicle 204 from other vehicles on roadway 206.

Returning now to FIG. 3, additional details of one or more embodiments of the SDV 202 are presented. The features shown in FIG. 3 may also be implemented in SDV 210 as well as compromised vehicle 204 (if architected to function as an SDV).

As shown in FIG. 3, SDV 202 has an SDV on-board computer 301 that controls operations of the SDV 202. According to directives from a driving mode device 307, the SDV 202 can be selectively operated in manual mode or autonomous mode (including the nominal autonomous mode, assistance autonomous mode, and/or stopping autonomous mode described above). In a preferred embodiment, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) or Laser Detection and Ranging (LADAR) system that measures the time it takes to receive back the emitted electromagnetic radiation (e.g., light), and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202, and/or the perform the amelioration actions described herein in response to detecting the compromised vehicle 204.

In one or more embodiments of the present invention, SDV 202 includes roadway sensors 311 that are coupled to the SDV 202. Roadway sensors 311 may include sensors that are able to detect the amount of water, snow, ice, etc. on the roadway 206 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 206 is using light sensors.

Similarly, a dedicated camera 321 can be trained on roadway 206, in order to provide photographic images capable of being evaluated, thereby recognizing compromised vehicle 204. For example, sequences of photographic images can show the velocity and any change in direction of compromised vehicle 204, thus providing the recognition of an anomalous driving pattern for compromised vehicle 204, as well as the current state (e.g., being upside down, askew to roadway 206, etc.) of compromised vehicle 204.

Similarly, a dedicated object motion detector 319 (e.g., a radar transceiver capable of detecting Doppler shifts indicative of the speed and direction of movement of compromised vehicle 204) can be trained on roadway 206, in order to detect the movement of compromised vehicle 204, thus providing the recognition of the anomalous driving pattern and/or location of compromised vehicle 204.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. If compromised vehicle 204 is equipped with such sensors, this information can be transmitted to SDV 202.

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301. Thus, alerts regarding compromised vehicle 204 may be transmitted to a smart phone within other SDVs or an authority (e.g., a local law enforcement agency).

Figure 5:
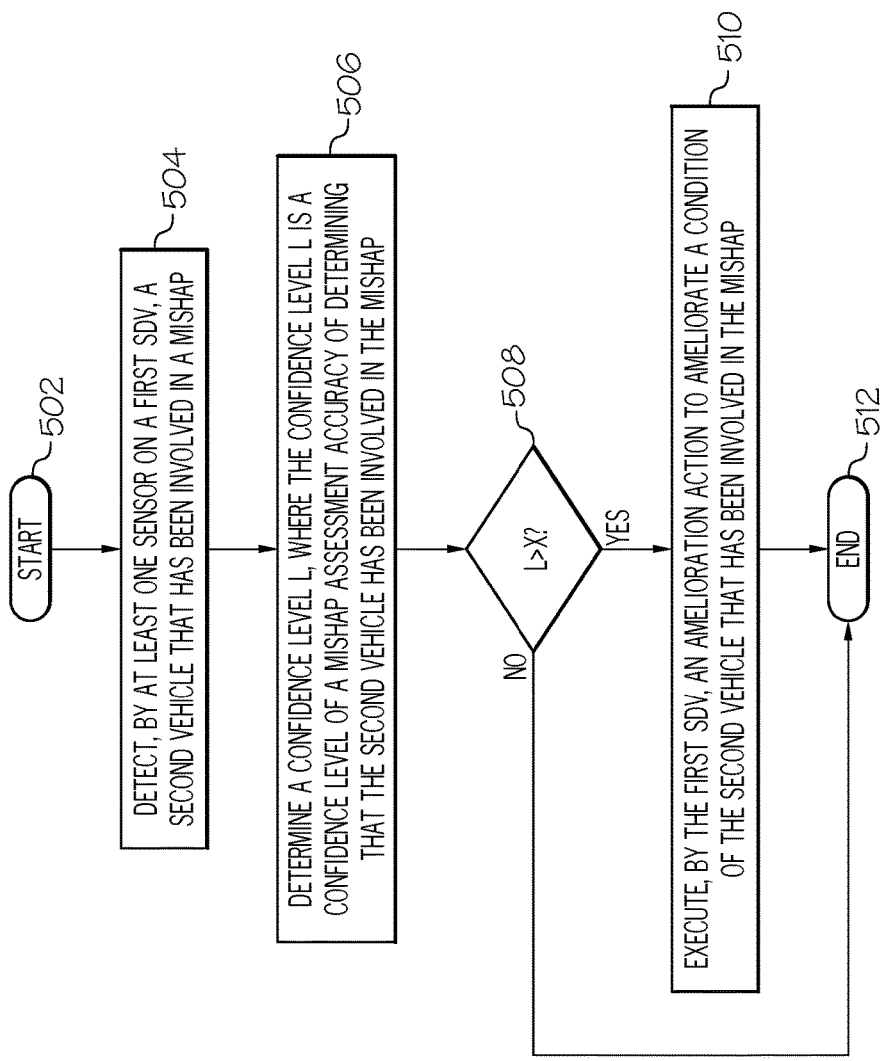
FIG. 5 is a high-level flow chart of one or more steps performed by an SDV to ameliorate a vehicular mishap incurred by a second vehicle in accordance with one or more embodiments of the present invention.

With reference now to FIG. 5, a high-level flow chart of one or more steps performed by one or more processors to ameliorate a vehicular mishap incurred by a second vehicle.

After initiator block 502, at least one sensor (e.g., object motion detector 319, camera 321, etc. shown in FIG. 3) detects a second vehicle (e.g., compromised vehicle 204 shown in FIG. 2) that has been involved in a vehicular mishap, as described in block 504. In one embodiment the vehicular mishap is a single vehicle mishap caused by a human and/or autonomous control of the second vehicle. In one embodiment, the vehicular mishap is a collision between two vehicles, including the second vehicle (e.g., compromised vehicle 204) but not the first SDV 202 depicted in FIG. 1. In one embodiment, the vehicular mishap is caused by a mechanical/electrical/etc. problem in the second vehicle.

As described in block 506, one or more processors (e.g., within SDV on-board computer 301 and/or a remote system such as that used by the first responder system 201 shown in FIG. 2) determine a confidence level L. This confidence level L is a confidence level of a mishap assessment accuracy of determining that the second vehicle has been involved in the vehicular mishap. That is, the higher the confidence level L, the more likely that the compromised vehicle 204 has actually been involved in a mishap or is otherwise in trouble.

In one embodiment of the present invention, the confidence level L is based on what is sensed regarding the compromised vehicle 204. For example, if camera 321 detects that compromised vehicle 204 is upside down, then it is highly likely that compromised vehicle 204 has been in a vehicular mishap. However, if camera 321 merely detects that compromised vehicle 204 is traveling along shoulder 212 in FIG. 2 at a speed that is 20 miles per hour below the posted limit, this may or may not be indicative of a problem. Similarly, light sensor 329 merely detecting a flashing light coming from compromised vehicle 204 may just be a turning signal (and thus no problem), while four-way flashers probably indicate a problem.

In one embodiment of the present invention, multiple inputs from multiple sensors on the first SDV describing the vehicular mishap increase a value of the confidence level L. For example, assume that LIDAR 333 detects the compromised vehicle 204 on the shoulder 212, microphone 331 detects the sounds of injured persons coming from compromised vehicle 204, camera 321 photographs the compromised vehicle 204 on its side, and chemical sensor 327 detects gasoline leaking from compromised vehicle 204. These mutually supportive sensor readings result in a very high confidence level L that compromised vehicle 204 has in fact been involved in a mishap.

As show in query block 508 in FIG. 5, a query is made as to whether or not confidence level L exceeds a predetermined value. If so, then the first SDV executes an amelioration action to ameliorate a condition of the second vehicle that has been involved in the vehicular mishap, as described in block 510.

The flow chart ends at terminator block 512.

In one embodiment of the present invention, the amelioration action is reporting the vehicular mishap to a third party, such as an insurance carrier, family members of passengers in the compromised vehicle, first responder authorities, etc. (e.g., SDV 202 reports the vehicular mishap to first responder system 201 in FIG. 1). While the first responder system 201 has been described herein as a system used by first responders (e.g., emergency medical services, fire departments, etc.), in one or more alternate embodiments first responder system 201 is actually a system that received information from SDV 202 on behalf of other entities, such as family members of passengers traveling in compromised vehicle 204, law enforcement agencies, insurance carriers and/or their claims adjusters, traffic management entities (e.g., a state or federal department of transportation), etc.

In one embodiment of the present invention, the amelioration action is taking and transmitting a photo of the vehicular mishap to a health care provider. For example, camera 321 shown in SDV 202 in FIG. 3 may take a photograph or video of compromised vehicle 204, and send it to a local first responder system 201, which may be an ambulance or hospital (health care provider). Even if the photo/video does not show injured passengers in the compromised vehicle 204, the photo of the compromised vehicle 204 itself will provide valuable information about the likely condition of its passengers. That is, if compromised vehicle 204 is upside down and severely compressed, this provides the health care provider with an indication that injuries are likely serious, and thus preparations (travel speed in an ambulance, medical equipment, extraction equipment, etc.) are made accordingly.

In one embodiment of the present invention, the first SDV 202 sends a report of the vehicular mishap to other SDVs within a predefined distance of the vehicular mishap. For example, assume that SDV 210 (one of other SDVS) is traveling behind SDV 202 (first SDV) in FIG. 2, and that SDV 202 detects compromised vehicle 204. SDV 202 will transmit a signal describing the state and location of compromised vehicle 204 to the other SDVs, thus allowing them to be prepared to take evasive maneuvers, take another route, etc.

In one embodiment of the present invention, the first SDV (e.g., SDV 202) determines that a second SDV (e.g., traveling on the roadway 206) is on a collision course with the second vehicle (e.g., compromised vehicle 204). In response to determining that the second SDV is on the collision course with the second vehicle, the first SDV issues, to the second SDV, electronic control instructions that redirect the second SDV on a course that avoids colliding with the second vehicle. That is, the first SDV issues directions to the SDV on-board computer 301 within the second SDV that redirects the movement of the SDV, thus avoiding a collision with the compromised vehicle 204.

In one embodiment of the present invention, the first SDV directs multiple SDVs to automatically provide a protective swarm around the second vehicle that has been involved in the vehicular mishap, as depicted and described in FIG. 4. In a preferred embodiment, creating this protective swarm is predicated by (i.e., not performed unless) the first SDV (e.g., SDV 202) determining, based on its positioning sensors, etc., that the second vehicle (e.g., compromised vehicle 204) poses a hazard to traffic (i.e., is in the line of traffic on roadway 206, etc.).

In one embodiment of the present invention, the second vehicle (e.g., compromised vehicle 204) transmits, to a health care provider (e.g., which uses the first responder system 201 shown in FIG. 2) real-time medical status information regarding passengers of the second vehicle that was involved in the vehicular mishap. That is, if possible, the compromised vehicle 204 reports to a local hospital and/or emergency medical service the state of passengers in the compromised vehicle 204. This state may be determined by biometric sensors that monitor the state of the passengers, such as respiration monitors, heart monitors, temperature sensors, etc.

In one embodiment of the present invention, a chemical sensor detects a hazardous fluid proximate to the second vehicle that was involved in the vehicular mishap. The first SDV 202 then transmits a message to a first responder authority (e.g., which uses the first responder system 201) describing the hazardous fluid coming from the compromised vehicle 204.

In one embodiment of the present invention, video, audio, and/or other sensors in the first SDV 202 detect a level of passenger movement of passengers within the second vehicle to create a passenger movement signal, and then the first SDV 202 transmits the passenger movement signal to a first responder authority, letting the first responders know that there are (likely injured) passengers within the compromised vehicle 204.

However, in another embodiment, the sensors in the first SDV 202 detect that the compromised vehicle 204 has no persons inside of it and/or near it. This leads to the indication that the compromised vehicle 204 is an SDV that only delivers cargo, not passengers. Thus, the absence of passengers in the compromised vehicle 204 lets the first responder system 201 know that there is 1) no need for medical care, and/or 2) the urgency of reaching the compromised vehicle 204 is reduced.

In one embodiment of the present invention, a camera and/or other biologic sensors within the first SDV 202 detect a person or animal proximate to the compromised vehicle 204. Such persons/animals are assumed to have been impacted the mishap (e.g., were struck by the compromised vehicle 204, were emotionally affected due to witnessing the mishap, etc.). As such, information about such entities (e.g., a photograph showing their condition) is transmitted to a health car provider, a first responder, family members, etc.

In one embodiment of the present invention, a camera within the first SDV 202 autonomously photographs a post-mishap site of the vehicular mishap to create a post-mishap site photograph, and then sends this post-mishap site photograph from the first SDV to a first responder authority. That is, the SDV 202 can take and send a video or still photograph of compromised vehicle 204 to the first responder system 201. This allows the first responder system to not only know the condition of the compromised vehicle 204, but can also provide valuable information (e.g., skid marks, scorch marks, etc.) to understand how the mishap occurred.

In one embodiment of the present invention, a positioning system (e.g., positioning system 151 shown in FIG. 1) that is incorporated into the first SDV determines a geophysical position of the vehicular mishap to create a vehicular mishap position signal, and then transmits that vehicular mishap position signal to a first responder authority.

In one embodiment of the present invention, assume that the compromised vehicle 204 (i.e., the "second vehicle) is also an SDV. In this embodiment, the first SDV 202 determines a safe location for the second SDV that has been involved in the vehicular mishap (e.g., completely off of roadway 206 and entirely on shoulder 212). SDV 202 then interrogates the compromised vehicle 204 to confirm that it is capable of operating in SDV-autonomous mode. If so, then the first SDV 202 takes "remote control" of SDV/compromised vehicle 204 and remotely drives the SDV/compromised vehicle 204 to the safe location.

In one embodiment of the present invention, one or more processors pool sensor information from multiple SDVs that sensed the vehicular mishap to create a multi-point-of-view (mPOV) composite report on the vehicular mishap. The mPOV composite report includes information about a location, speed, heading, and movement of the second vehicle before and after the vehicular mishap. The mPOV composite report includes panoramic imagery, light detection and ranging (LIDAR) models, and rotational information through scene and object stitching based on sensor readings from the multiple SDVs. That is, information from multiple SDV about the compromised vehicle 204 is assembled into a single mPOV composite report, which provides an overall description of the mishap site and the compromised vehicle 204 that is not possible from a single SDV. In a simplest form, this mPOV composite report is a collection of different photographs of the mishap site, which are compiled into a panoramic view. In a more detailed form, the mPOV composite report includes information about the location, movement, environment (chemical, sound, temperature) around the compromised vehicle 204, etc.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
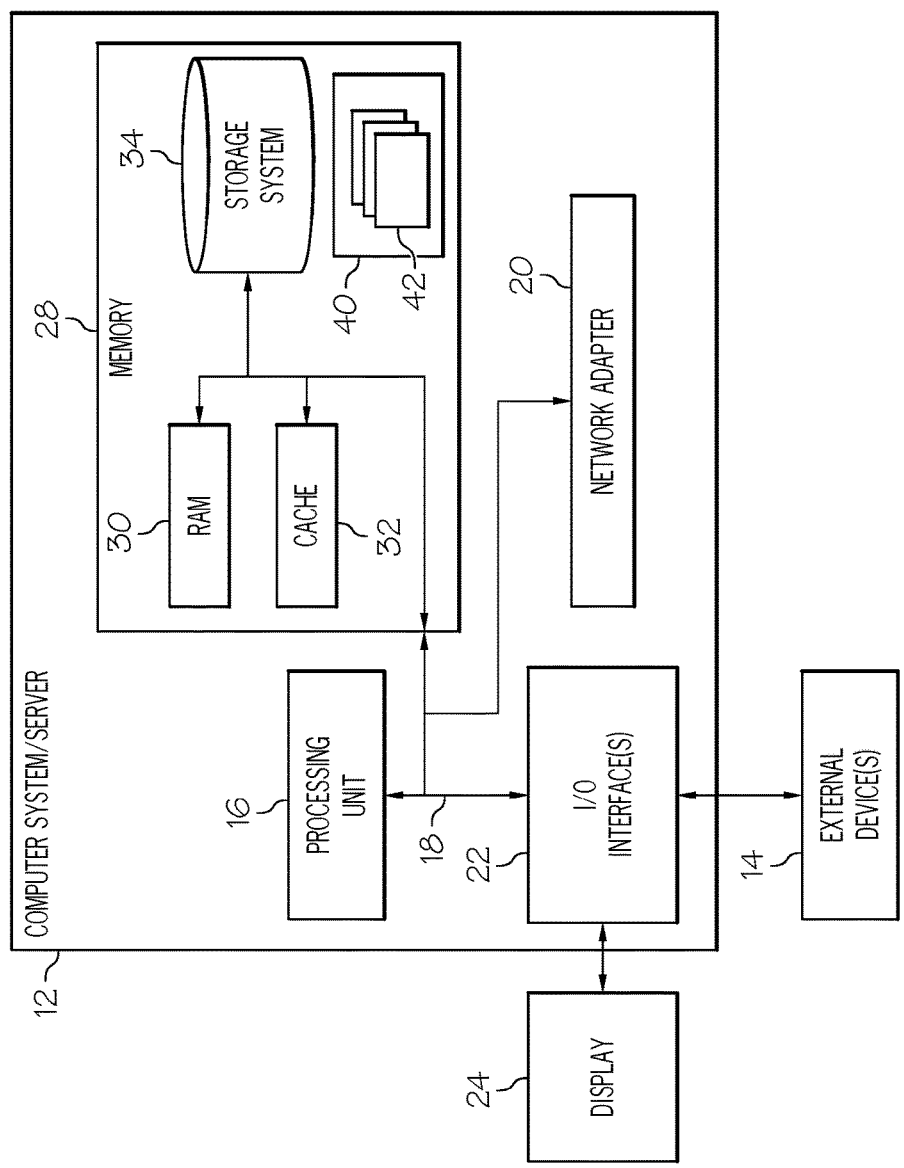
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
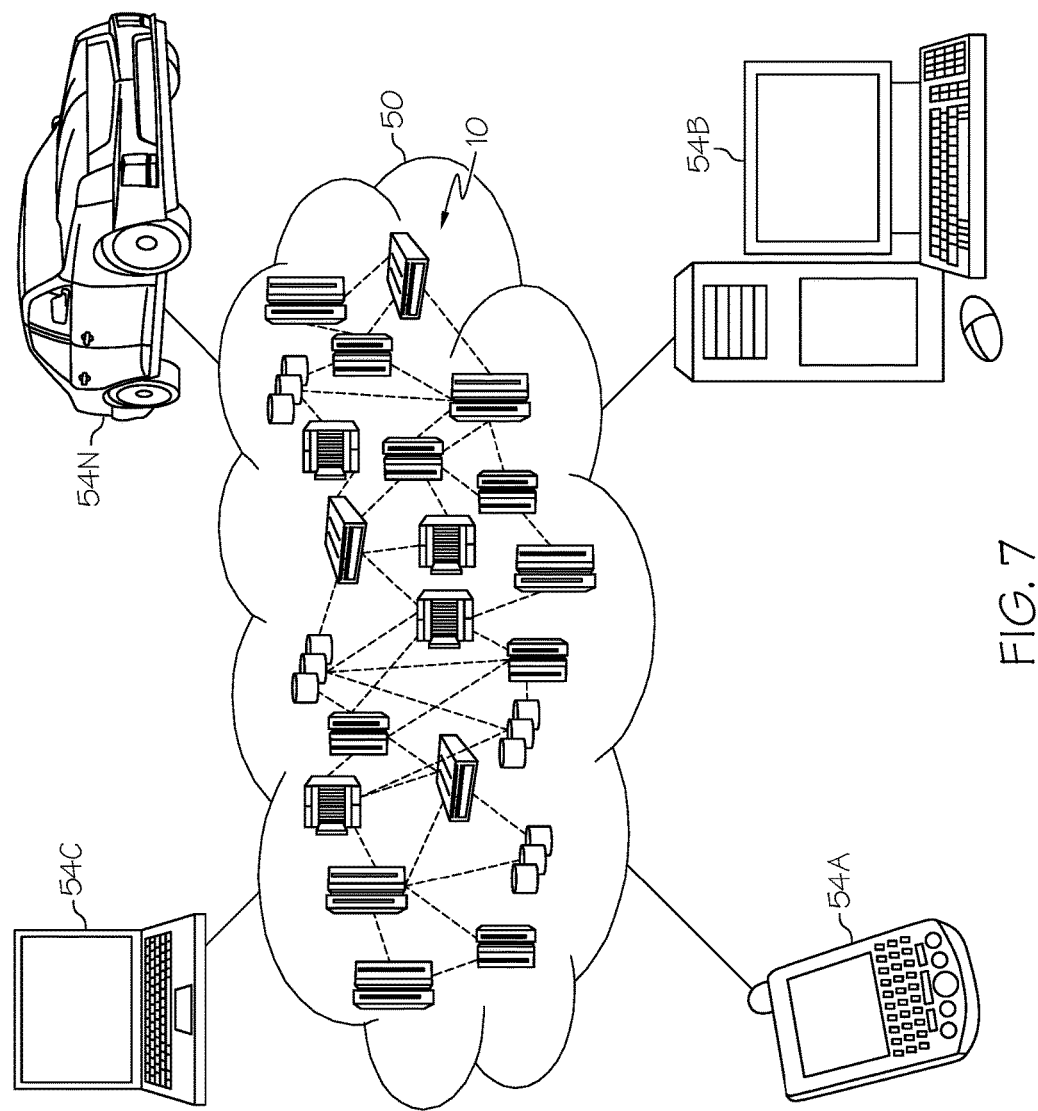
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
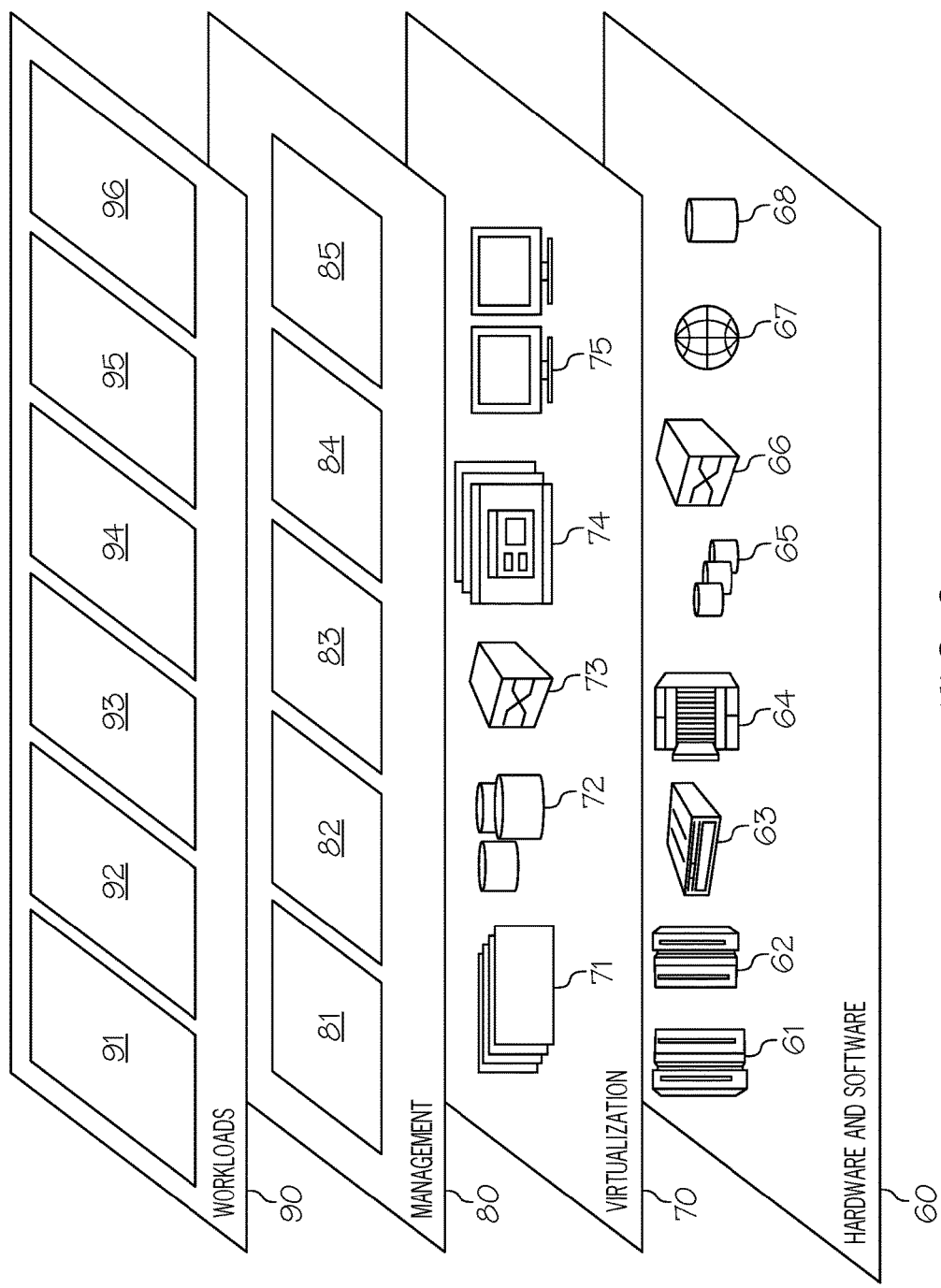
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mishap amelioration processing 96 (for ameliorating results of a vehicular mishap as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for a first self-driving vehicle (SDV) ameliorating a vehicular mishap incurred by a second vehicle, the method comprising:
    detecting, by at least one sensor on a first SDV, a second vehicle that has been involved in a vehicular mishap;
    determining, by one or more processors, a confidence level L, wherein the confidence level L is a confidence level of a mishap assessment accuracy of determining that the second vehicle has been involved in the vehicular mishap; and
    in response to the confidence level L exceeding a predetermined value, executing, by the first SDV, an amelioration action to ameliorate a condition of the second vehicle that has been involved in the vehicular mishap, wherein the amelioration action is an action that is performed by the first SDV independently of the second vehicle.

2. The method of claim 1, wherein the vehicular mishap is a collision in which the second vehicle was involved.

3. The method of claim 1, wherein the vehicular mishap is an equipment failure in the second vehicle.

4. The method of claim 1, wherein the first SDV was not involved in the vehicular mishap.

5. The method of claim 1, wherein said at least one sensor on the first SDV is from a group consisting of a light detection and ranging (LIDAR) system, a video camera, a microphone, and a vibration detector.

6. The method of claim 1, wherein multiple inputs from multiple sensors on the first SDV describing the vehicular mishap increase a value of the confidence level L.

7. The method of claim 1, wherein the amelioration action is taking and transmitting a photo of the vehicular mishap to a third party.

8. The method of claim 1, wherein the amelioration action is capturing and transmitting air sensor readings to a third party, wherein the air sensor readings describe chemicals being released from the second vehicle.

9. The method of claim 1, wherein the first SDV is dedicated to autonomously scouting for vehicular mishaps.

10. The method of claim 1, further comprising:
    reporting, by the first SDV, a report of the vehicular mishap to other SDVs within a predefined distance of the vehicular mishap.

11. The method of claim 1, further comprising:
determining, by the first SDV, that a second SDV is on a collision course with the second vehicle; and
in response to determining that the second SDV is on the collision course with the second vehicle, issuing, from the first SDV to the second SDV, electronic control instructions that redirect the second SDV on a course that avoids colliding with the second vehicle.

12. The method of claim 1, further comprising:
directing, by the first SDV, multiple SDVs to automatically provide a protective swarm around the second vehicle that has been involved in the vehicular mishap, wherein the protective swarm protects the second vehicle from being struck by other vehicles.

13. The method of claim 1, further comprising:
transmitting, from the second vehicle to a health care provider, real-time medical status information regarding persons that were impacted by the vehicular mishap.

14. The method of claim 1, further comprising:
detecting, by said at least one sensor on the first SDV, a hazardous fluid proximate to the second vehicle that was involved in the vehicular mishap; and
transmitting, by the first SDV, a message describing the hazardous fluid to a first responder authority.

15. The method of claim 1, further comprising:
detecting, by said at least one sensor on the first SDV, a level of passenger movement of passengers within the second vehicle to create a passenger movement signal; and
transmitting the passenger movement signal from the first SDV to a first responder authority.

16. The method of claim 1, further comprising:
detecting, by said at least one sensor on the first SDV, an absence of any passengers within the second vehicle to create an empty vehicle signal; and
transmitting the empty vehicle signal from the first SDV to a first responder authority.

17. The method of claim 1, wherein the amelioration action does not direct the second vehicle to perform any action.

18. The method of claim 1, further comprising:
pooling, by one or more processors, sensor information from multiple SDVs that sensed the vehicular mishap to create a multi-point-of-view (mPOV) composite report on the vehicular mishap, wherein the mPOV composite report comprises information about a location, speed, heading, and movement of the second vehicle before and after the vehicular mishap, and wherein the mPOV composite report comprises panoramic imagery, light detection and ranging (LIDAR) models, and rotational information through scene and object stitching based on sensor readings from the multiple SDVs.

19. A computer program product for a self-driving vehicle (SDV) ameliorating a vehicular mishap incurred by a second vehicle, the computer program product comprising a non-transitory computer readable storage medium having program code embodied therewith, the program code readable and executable by a processor to perform a method comprising:
detecting, by at least one sensor on a first SDV, a second vehicle that has been involved in a vehicular mishap;
determining a confidence level L, wherein the confidence level L is a confidence level of a mishap assessment accuracy of determining that the second vehicle has been involved in the vehicular mishap;
in response to the confidence level L exceeding a predetermined value, executing, by the first SDV, an amelioration action to ameliorate a condition of the second vehicle that has been involved in the vehicular mishap; and
directing, by the first SDV, multiple SDVs to automatically provide a protective swarm around the second vehicle that has been involved in the vehicular mishap, wherein the protective swarm protects the second vehicle from being struck by other vehicles.

20. A self-driving vehicle (SDV) comprising:
a processor, a computer readable memory, and a non-transitory computer readable storage medium;
first program instructions to detect, by at least one sensor on the SDV, a second vehicle that has been involved in a vehicular mishap;
second program instructions to determine a confidence level L, wherein the confidence level L is a confidence level of a mishap assessment accuracy of determining that the second vehicle has been involved in the vehicular mishap;
third program instructions to, in response to the confidence level L exceeding a predetermined value, execute, by the SDV, an amelioration action to ameliorate a condition of the second vehicle that has been involved in the vehicular mishap; and
fourth program instructions to pool sensor information from multiple SDVs that sensed the vehicular mishap to create a multi-point-of-view (mPOV) composite report on the vehicular mishap, wherein the mPOV composite report comprises information about a location, speed, heading, and movement of the second vehicle before and after the vehicular mishap, and wherein the mPOV composite report comprises panoramic imagery, light detection and ranging (LIDAR) models, and rotational information through scene and object stitching based on sensor readings from the multiple SDVs; and wherein
the first, second, third, and fourth program instructions are stored on the non-transitory computer readable storage medium for execution by one or more processors via the computer readable memory.

* * * * *